United States Patent
Wen et al.

(10) Patent No.: US 7,027,388 B2
(45) Date of Patent: Apr. 11, 2006

(54) 1+1 MESH PROTECTION

(75) Inventors: Wushao Wen, Livermore, CA (US);
Shishir Ramam, Campbell, CA (US);
Premal Dinesh Desai, San Jose, CA (US); Neeraj Gulati, Cupertino, CA (US); John Stephen Brenneman, Menlo Park, CA (US)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 10/941,991

(22) Filed: Sep. 16, 2004

(65) Prior Publication Data

US 2005/0128940 A1    Jun. 16, 2005

Related U.S. Application Data

(60) Provisional application No. 60/529,113, filed on Dec. 15, 2003.

(51) Int. Cl.
*H04L 12/26* (2006.01)

(52) U.S. Cl. ..................................... 370/216

(58) Field of Classification Search ............... 370/216, 370/225, 226, 227, 228, 241, 242, 244
See application file for complete search history.

(56) References Cited

U.S. PATENT DOCUMENTS

| 6,654,341 | B1 | 11/2003 | Chi et al. | |
| 6,848,062 | B1 | 1/2005 | Desai et al. | |
| 6,859,431 | B1 | 2/2005 | Tedijanto et al. | |
| 2003/0147352 | A1* | 8/2003 | Ishibashi et al. | 370/248 |
| 2003/0206516 | A1* | 11/2003 | Chen et al. | 370/227 |
| 2003/0229807 | A1* | 12/2003 | Qiao et al. | 713/200 |
| 2005/0071484 | A1* | 3/2005 | Kang et al. | 709/230 |

FOREIGN PATENT DOCUMENTS

WO    WO 00/52890    9/2000

\* cited by examiner

*Primary Examiner*—Kwang Bin Yao
(74) *Attorney, Agent, or Firm*—Olds, Maier & Richardson, PLLC (57) ABSTRACT

1+1 Mesh Protection provides 1+1 protection for connections across an automatically routed mesh network, where a connection is setup automatically by using an intelligent signaling and routing protocol. 1+1 Mesh Protection can set up, tear down, and reroute both the working path and protect path across the mesh network automatically based on a specified service profile. 1+1 Mesh Protection interoperates seamlessly with traditional 1+1 protection mechanisms such as APS 1+1 protection in SONET networks.

29 Claims, 10 Drawing Sheets

1+1 MESH PROTECTION

CROSS-REFERENCE TO RELATED APPLICATIONS

This application claims priority under 35 U.S.C. § 119(e) on U.S. Provisional Patent Application No. 60/529,113 filed on Dec. 15, 2003. The disclosure of which is incorporated herein by reference in its entirety.

BACKGROUND OF THE INVENTION

In current large-scale networks, information flows through a series of nodes or network elements in the network from one location or site to another. As the network grows, more and more transmission lines may be added to handle the heavy traffic flow between network elements. Network switches are used to connect one transmission line to another and to manage information flow through a network. As networks increase in size and complexity, more switches and transmission lines are added. An example of such a network switch is the MultiWave CoreDirector switch, manufactured and distributed by CIENA Corporation of Linthicum, Md.

To enhance reliability of communications through networks, various line/path protection schemes can be used, as is known in the art. For example, Sub-Network Connection Protection (SNCP) is a standard protocol in Synchronous Optical Network (SONET)/Synchronous Digital Hierarchy (SDH) systems (reference to SONET hereinafter shall mean either SONET or SDH). The protection protocol can include a working line and a protect line. Typically, the working line and protect line are matched in capabilities (e.g., number of channels, bandwidth, and the like). In the event of a failure on the working line, the protect line can be used to maintain the network connection and reduce down time. Service providers often commit to various class of service requirements that can specify penalties for network down time. Therefore, service providers can lose significant revenue due to communication line failures. Accordingly, many service providers use protected lines to reduce down time on critical services.

Various protection techniques are known in the art, such as ring-based, linear and mesh protection. An advantage of a ring-based network protection scheme is that the traffic between two nodes on the ring can be re-routed over a predetermined secondary route, if a failure should occur in a primary route. An example of such a network is a SONET ring, with predefined primary and secondary, or working and protection, routes between the nodes on the ring. The routes may be over redundant rings, which pass traffic simultaneously in opposite directions. Such a system is commonly referred to as a "unidirectional ring."

When a failure or a significant degradation in, for example, the primary path, is detected on a SONET ring, the system must automatically re-route, or switch, affected traffic from the primary path to the secondary path. The re-routing, which is commonly referred to as "protection switching," is performed in unidirectional systems by the destination nodes, that is, by the nodes that terminate the traffic or route the traffic off of the ring to a user or another network. In the example, the destination nodes switch from receiving the affected traffic over the primary path to receiving the traffic over the secondary path.

For example, in a 1:1 protection scheme two redundant paths are provisioned, but only one path is used. In contrast a 1+1 protection scheme, allows both paths (e.g., the working and the protect) to concurrently transmit packets. Other schemes include, multiple working paths sharing a protect path (referred to as 1:N protection). Protection topologies also vary depending on the network topology and can be implemented in linear, ring, mesh configurations or Virtual Line Switched Ring (VLSR). A Virtual Line Switched Rings is described in more detail in U.S. Pat. No. 6,654,341, Virtual Line Switched Ring, filed on Oct. 19, 1999, which is herein incorporated by reference in its entirety. Further, protection mechanisms can be implemented at the link level such as automatic protection switching (APS) or at higher levels such as ring level bi-directional line switched ring (BLSR).

Figure 1:
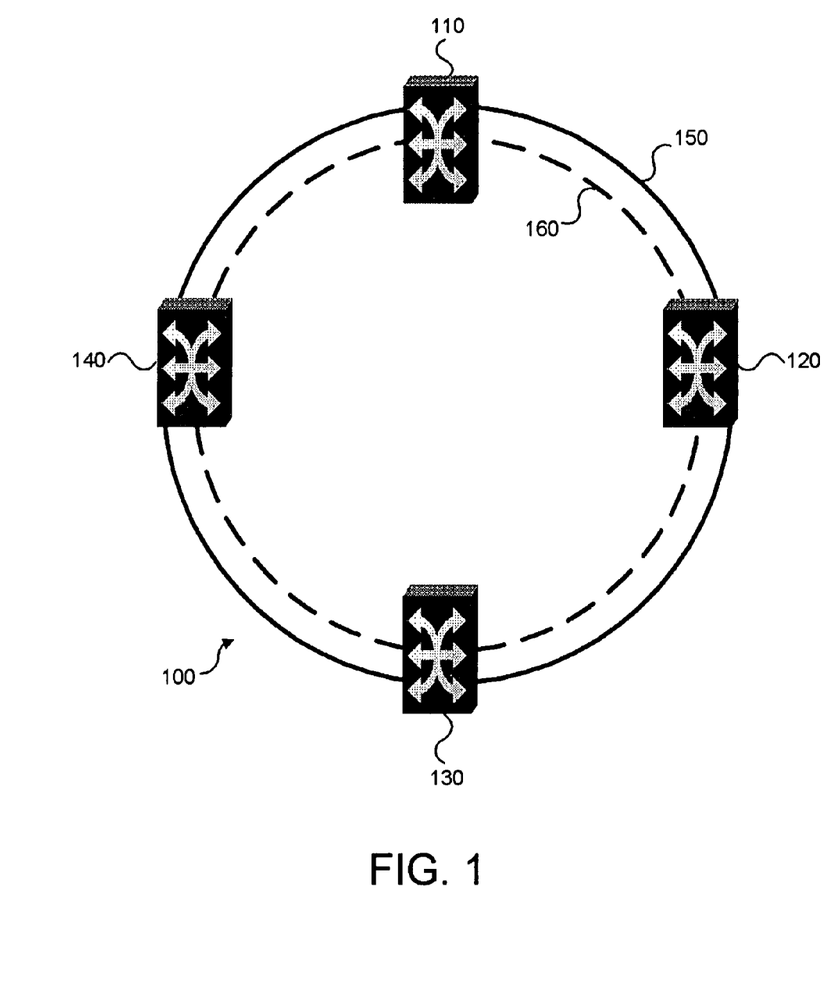
FIG. 1 illustrates a ring topology having a working path and a protect path.

FIG. 1 illustrates a ring topology 100 having a working path 150 and a protect path 160 interconnecting nodes 110, 120, 130 and 140. For example, using a 1:1 protection scheme working path 150 can be used to transmit information between nodes 110–140. Protect path 160 is provisioned, but the information is not transmitted over the protect path 160. However, in the event of a failure in a portion of path 150, protection switching will cause the information transmission to be switched to protect path 160.

SUMMARY OF THE INVENTION

Embodiments of the invention can include a 1+1 mesh protection method comprising: receiving a request for a 1+1 protection service at a network element in a mesh network; provisioning a first connection in the mesh network at the network element based on a service profile; provisioning a second connection in the mesh network at the network element based on the service profile; determining if provision parameters of the first connection and the second connection are compatible; setting up the first and second connections if the provision parameters are compatible; and rejecting the connection if the provision parameters are not compatible.

Additionally, embodiments of the invention can include a 1+1 mesh protection system comprising: a provisioning module configured to receive a request for a 1+1 protection service at a network element in a mesh network and to provision first and second connections in the mesh network at the network element based on a service profile; a detection module configured to determine if provision parameters of the first connection and a second connection are compatible; and a setup module configured to set up the first and second connections if the provision parameters are compatible and to reject the connection if the provision parameters are not compatible.

Embodiments of the invention can also include a 1+1 mesh protection apparatus comprising: means for receiving a request for a 1+1 protection service at a network element in a mesh network; means for provisioning a first connection in the mesh network at the network element based on a service profile; means for provisioning a second connection in the mesh network at the network element based on the service profile; means for determining if provision parameters of the first connection and the second connection are compatible; means for setting up the first and second connections if the provision parameters are compatible; and means for rejecting the connection if the provision parameters are not compatible.

Further scope of applicability of embodiments of the present invention will become apparent from the detailed description given hereinafter. However, it should be understood that the detailed description and specific examples are given by way of illustration only, since various changes and modifications within the spirit and scope of the invention will become apparent to those skilled in the art from this detailed description.

BRIEF DESCRIPTION OF THE DRAWINGS

Advantages of embodiments of the present invention will be apparent from the following detailed description of the preferred embodiments thereof, which description should be considered in conjunction with the accompanying drawings, which are presented solely for illustration and not limitation of the invention, and in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of the invention will not be described in detail or omitted so as not to obscure the relevant details of the invention.

Typically, a network element supports both a signaling protocol and a routing protocol. For example, a network element can support Optical Signaling and Routing Protocol ("OSRP"), which is developed and distributed by CIENA Corporation and is described in more detail in commonly owned and co-pending U.S. patent application Ser. No. 09/259,263 filed on Mar. 1, 1999, entitled "Routing and Signaling in a SONET Network", which is incorporated by reference herein in its entirety.

Additionally, networks can have various protection schemes, such as discussed in the background. The following description is directed to a path level 1+1 mesh protection scheme. An example of line level mesh protection in a network is described in commonly owned and co-pending U.S. patent application Ser. No. 10/037,156 filed on Dec. 21, 2001, entitled "Mesh Protection Service in a Communications Network", which is incorporated by reference in its entirety herein.

In describing the embodiments below, reference will be made to OSRP paths, links and lines. OSRP is a distributed protocol designed for controlling a network of optical cross-connects (OXCs). OSRP introduces intelligence in the control plane of the optical transport system. It can perform many functions such as automatic resource discovery, distributing network resource information, and establishing and restoring connections dynamically across the network. However, the invention is not limited to OSRP. Those skilled in the art will appreciate that other intelligent signaling and routing protocols that can (or can be modified to) provide similar functionality as OSRP (e.g., automatically establishing and restoring connections across the network, and the like) are within the scope of embodiments of the invention.

In accordance with at least one embodiment of the invention, 1+1 mesh protection provides a mechanism that enables one plus one protection for connections across an automatically routed optical mesh network (e.g., where a connection is setup automatically using OSRP). 1+1 mesh protection can set up, tear down, and reroute either or both the working path and protect path across an optical mesh network automatically based on a specified service profile. 1+1 mesh protection can provide very high reliability and low protection-switching time if a working path fails. 1+1 mesh protection can seamlessly interoperate with traditional 1+1 protection mechanisms such as Automatic Protection Switching (APS) 1+1 protection, and Bidirectional Line-Switched Ring (BLSR). 1+1 mesh protection can reduce network operating and maintenance costs by using OSRP for point-and-click provisioning to setup the 1+1 connections. Additionally, 1+1 mesh protection can provide higher availability by using OSRP to mesh restore working and protect paths upon failure. These features and others are described in greater detail in the following disclosure.

According to at least one embodiment of the invention, OSRP is used to provision the 1+1 service (e.g., using point-and-click provisioning) which reduces the operational costs of provisioning and maintaining the 1+1 connections. For example referring to FIG. 2, a network administrator can select at least one terminating network element (e.g., 20 and 50). For purposes of the description herein the terminating network element(s) can be considered to be the network element(s) in the mesh network that have either a working, a protect, or both connections and that interface to an edge network. Then, based on a defined service profile (which can be a default service profile or entered by a network administrator), OSRP can automatically determine routes through the network for both working and protect paths and set up both the working and protect paths (e.g., 210 and 220). Alternatively, point and click provisioning can be used to specify an explicit route for either or both the working and protect paths.

Once the route is established, OSRP can use the signaling component of OSRP to set up the paths so that traffic can be carried therein. Furthermore, 1+1 mesh protection can be extended to provide higher availability using the unconstrained mesh capabilities provided by OSRP. For example, if a failure occurs in either the working or protect path, the failed path can be automatically restored using mesh restoration features available in OSRP based on the previously defined service profile. These aspects of OSRP are discussed in greater detail in previously cited U.S. patent application Ser. No. 09/259,263, "Routing and Signaling in a Sonet Network", and in commonly owned co-pending U.S. patent application Ser. No. 09/493,344, filed Jan. 28, 2000, entitled "System and Method for Calculating Protection Routes in a Network Prior to Failure", which is herein incorporated by reference in its entirety.

Figure 2:
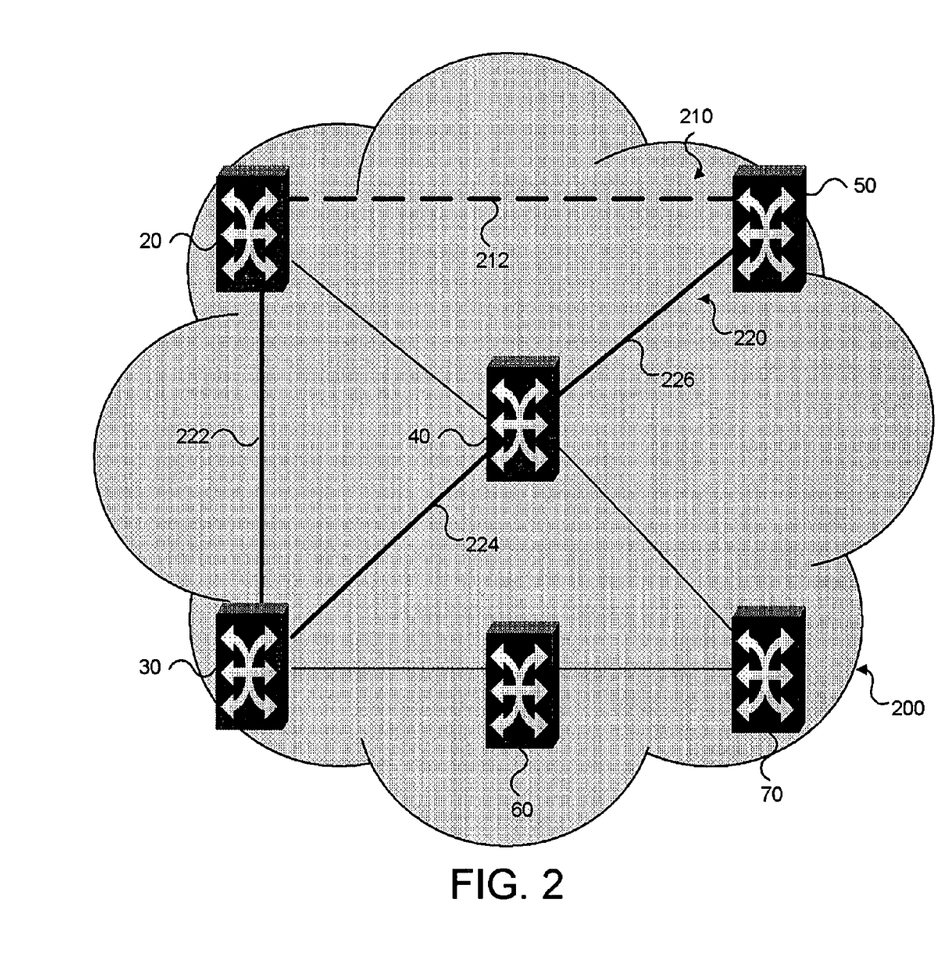
FIG. 2 illustrates a mesh network having a working path and a protect path.

For example, referring to FIG. 2, a protect path 210 and a working path 220 in mesh network 200 are illustrated. The protect path 210 includes network elements 20 and 50, and link 212. Working path 220 includes network elements 20, 30, 40 and 50 and links 222, 224, and 226, which can be established as a route between network elements 20 and 50.

As discussed above, the route can be generated automatically using OSRP or a network administrator can establish the route explicitly. In either case the signaling portion of OSRP can be used to send out setup requests for each path. After all network elements along each route accept the setup request, cross-connects can be created and each path can then be live to carry traffic.

In contrast to the ability to use point and click provisioning and OSRP to establish the working and protect connections through the optical network, prior related art techniques require extensive manual intervention in planning the route, setting up and verifying each path (working and protect) through the network, typically on a node by node basis. The prior related art process is very time consuming and manpower intensive, which increases the cost of providing and maintaining the 1+1 protection service. If a failure occurs the protection switching is automatically performed, as in the present invention. However, there is no ability to automatically restore the failed path in the related art. Accordingly, a path failure requires additional manual intervention and increased cost to reroute and reestablish the failed path.

As previously discussed, traffic is simultaneously conducted over the working path 220 and protect path 210 in the optical mesh network for the 1+1 mesh protection. Those skilled in the art will appreciate that it is desirable to have the working path and protect paths as disjoint as possible, so that a single failure does not disrupt both the working and protect paths. However, due to a variety of factors it is not always possible to maintain completely independent paths through the network. Accordingly, portions of the working and protect paths can share resources (e.g., the same fiber bundle, interface, and the like), if necessary.

Figure 3:
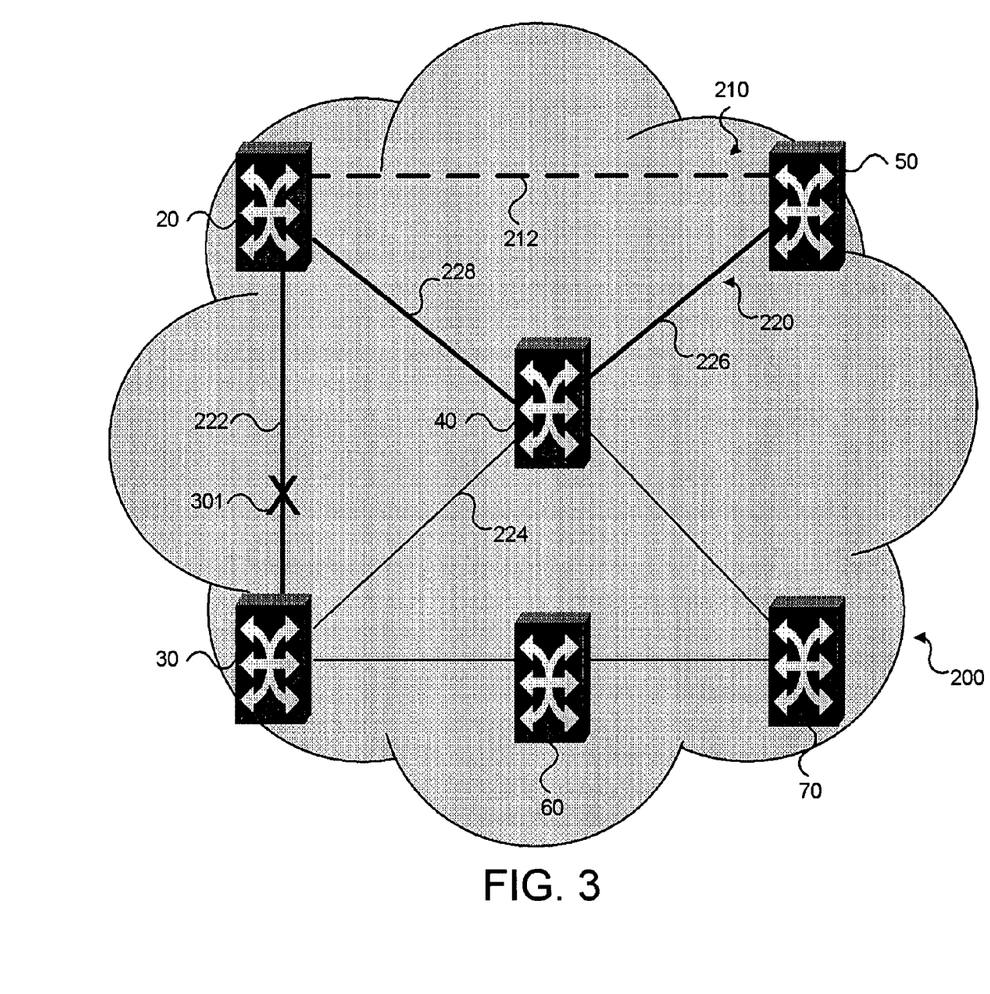
FIG. 3 illustrates a mesh network having a working path and a protect path, with a failure in one link of the working path and rerouting an alternative connection.

Referring to FIG. 3, if a failure 301 occurs in one of the links (e.g., 222), then a protection switching can occur at network element 50 from the working path 220 to the protect path 210 to maintain the integrity of the traffic. Those skilled in the art will appreciate that the failure can be the result of a variety of conditions such as a hard failure (e.g., cut fiber), soft failure (signal degradation) and the like. Regardless of the reason for the failure, the network element 50 can detect the failure due to the loss of signal (including bit error rate (BER) in excess of a predetermined threshold) and activate protection switching as is known in the art. Further, the failure notification and switching signaling can be communicated over the overhead bytes, as also known in the art. In a preferred embodiment, bytes within the overhead section of a conventional SONET frame, known as data communications channel (DCC) bytes, can be encoded with the failure notification and switching signaling and transmitted from network element to network element using conventional SONET equipment. However, those skilled in the art will appreciate that any available signaling mechanism can be used.

Additionally, the working path can be automatically mesh restored (e.g., using OSRP) thus making the overall availability of the 1+1 mesh protection connections higher. For example, as illustrated, working path 220 is restored when OSRP is used to reroute the working path through link 228, as illustrated in FIG. 3. Network element 50 upon detection of the failure can use the network topology information and the previously established service profile for the 1+1 mesh protection connection to reestablished the working path between network element 20 and network element 50. Specifically, by establishing link 228 between network element 20 and network element 40, working path 220 can be restored. Working path 220 after restoration contains network elements 20, 40 and 50 and links 228 and 226.

For example, when the failure of link 222 is detected, a conventional release message can be generated at network element 50 and communicated to network element 20. Upon receiving the release message, network element 20 stops transmitting to the failed link 222. Additionally, network element 50 proceeds to calculate an alternate route (e.g., 20, 40, and 50) based on the previously defined service profile used to setup the original 1+1 mesh protection service and its knowledge of the network topology. Once an alternate route is identified, the signaling protocol sends out a setup request that is communicated to all network elements along the route. Once the setup request is accepted by all network elements, the cross connect is established and working path 220 is once again online. Accordingly, 1+1 protection has been automatically restored.

Alternatively, if the protect path 210 goes down, OSRP can mesh restore the protect path while the traffic is transmitted on the working path 220 uninterrupted. Once again, the automatic mesh restoration of the path that has failed increases the availability of the 1+1 protection. Further, since both network elements 20 and 50 are terminating network elements and contain both working and protect connections, the ability to monitor and restore the working and protect paths can be performed at either network element.

As discussed above, to provision a 1+1 protection connection in a mesh network according to embodiments of the invention, a network administrator can use point-and-click provisioning to specify service profiles for the 1+1 mesh protection connection, and OSRP can setup the 1+1 mesh protection connection automatically. If the working or protect path fails, OSRP can automatically compute, setup and restore the path to an alternative route (e.g., using mesh restoration). Accordingly, in accordance with at least one embodiment of the invention, 1+1 mesh protection can utilize an intelligent routing and signaling protocol, such as OSRP, having an automatic mesh restoration feature, to make the optical mesh network more flexible, survivable and amenable to traffic engineering by providing 1+1 mesh protection. These features can allow network operators to provision 1+1 connections using automatic provisioning models similar to those used for establishing conventional independent connections, which is describe in greater detail in the aforementioned applications entitled "Routing and Signaling in a SONET Network", and "System and Method for Calculating Protection Routes in a Network Prior to Failure". By leveraging the intelligence of the signaling and routing protocol, 1+1 mesh protection according to embodiments of the invention, can provide a premium service across an optical mesh network that reduces the operational cost by using point-and-click provisioning and ensuring higher availability by using automatic mesh restoration for the working path and protect path.

In embodiments of the invention, a terminating network element (e.g., head-end, tail-end) can be a network element in an edge network that connects to one or more optical mesh networks. The terminating network element can also be a network element that is part of the optical mesh network (e.g., network elements 20 and 50). In the following description, head-end and tail-end are used for illustrative purposed only. Those skilled in the art will appreciate that typically the terminating network element operates in a bidirectional mode so that it can be functionally either a head-end or tail-end element based on the direction of the traffic through the network.

In embodiments of the invention, a head-end network element can include a bridge function configured to transmit two copies of traffic across the network on both paths while a tail-end network element can include a select function that is configured to select the better of the two received path signals. Accordingly, there does not have to be any interaction between the head-end network element and the tail-end network element in the 1+1 mesh protection protocol.

If a head-end or a tail-end network element is not located in the optical mesh network, a network administrator can specify the connecting network elements and drop sides on optical mesh network(s) that interconnect to the edge networks for both paths (e.g., type-2 and type-3 configurations discussed below). If the head-end network element is one of the network elements in the optical mesh network, the working path and protect path can have the same or different originating drop side. Likewise, if the tail-end network element is one of the network elements in the optical mesh network, the working path and the protect path can have the same or different terminating drop sides.

Additionally, in the type 2 and 3 configurations, the route to be taken inside the optical mesh network can be specified by the network operator, or can be calculated automatically by the optical mesh network itself using an optical routing protocol (ORP). The optical signaling protocol (OSP) component of OSRP can be used to set-up and tear down the protected connection across the optical mesh network for both the working path and the protect path. Cross-connects for these paths are established automatically throughout the optical mesh network via two OSRP call set-ups, one for the working and one for the protect path. Using OSP to create a protected connection (e.g., working and protect paths) can simplify the creation, maintenance, and deletion of the protected connection.

After the 1+1 mesh protection connection is set up, both the working and protect paths are monitored for a failure (e.g., loss of signal, signal degradation, and the like). If a failure is detected on the working path, the tail-end network element can detect the traffic loss and automatically switch to receive traffic from the protect path. Depending on the provision policy, the working path can be automatically mesh restored using an alternate route through the mesh network if the failure occurs within the optical mesh network (e.g., as discussed above with reference to FIG. 3). At least one terminating network element can be used to generate the appropriate signaling to restore the failed path as both paths are present and monitored in the terminating network element.

Alternatively, if the failure is outside the mesh network, the working path can wait for the failure recovery and no mesh restoration takes place. For example, referring to FIG. 4, if the failure occurs in the working line of an APS 1+1 link connecting network element 250 to network element 20, the mesh restoration process is not activated because the working path through mesh network 200 has not failed. However, protection switching will still occur because the working path has failed as seen from the tail-end network element. Therefore, 1+1 mesh protection can support Service Level Agreements (SLAs) that permit only very short service interruptions across optical mesh networks.

Figure 4:
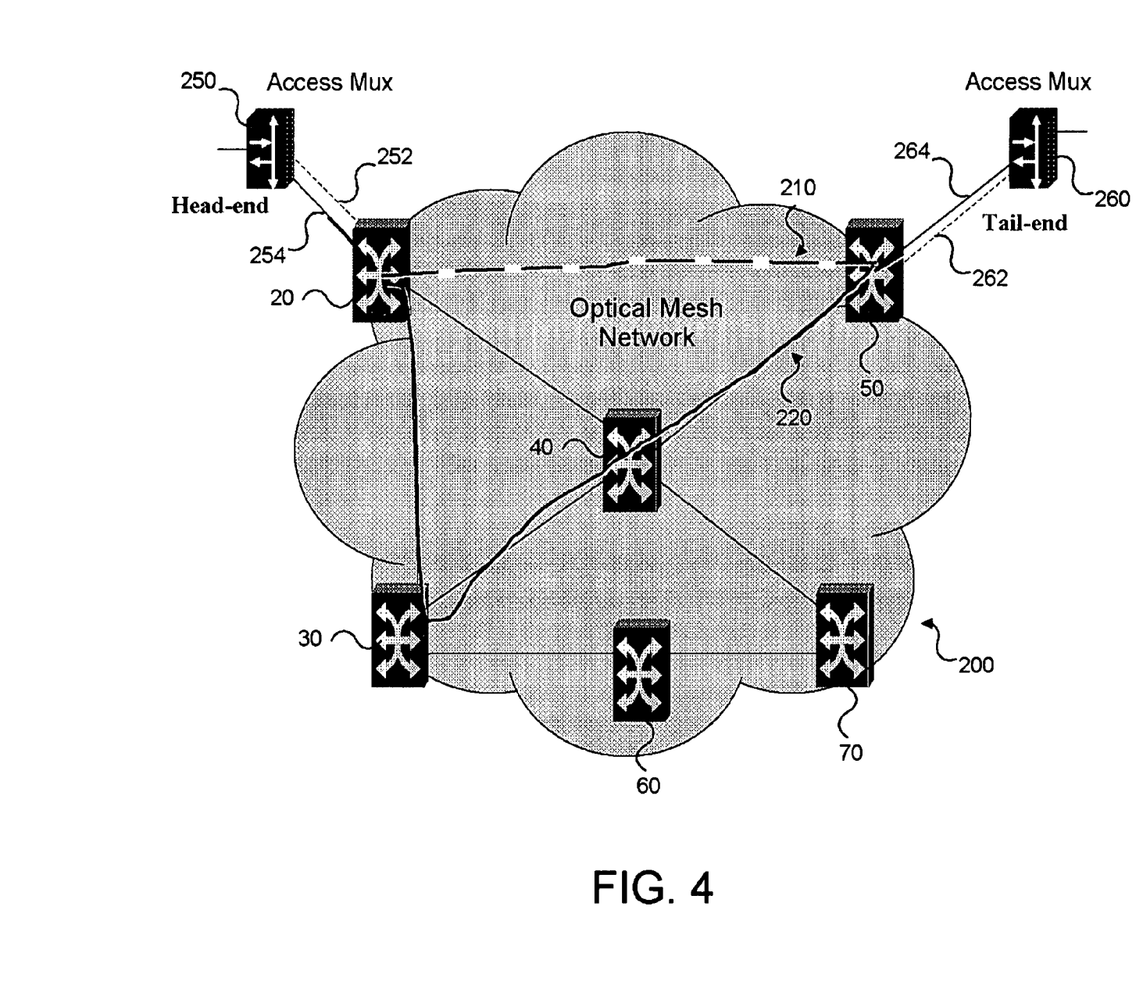
FIG. 4 illustrates a type-1 configuration of a mesh network having a working path and a protect path.

FIGS. 4–7 illustrate examples of four types of configurations for 1+1 mesh protection. Referring to FIG. 4, a type-1 configuration is illustrated and includes the working path 220 and the protect path 210 originating from the same terminating network element 20 and the same drop side from an external network element (e.g., add/drop multiplexer MUX 250). Likewise, the working path 220 and protect path 210 terminate to the end network element 50 and the same drop side on the optical mesh network 200 to an external network element (e.g., MUX 260). However, the working path 220 and protect path 210 use different routes across the optical mesh network 200. For example, the protect path 210 is routed directly from network element 20 to network element 50. In contrast, the working path 220 is routed from network element 20 through network elements 30 and 40 to network element 50, as illustrated. As discussed above, the routes are typically selected to be disjoint as possible to reduce the likelihood that one failure will interrupt traffic on both the working and protect paths.

Figure 5:
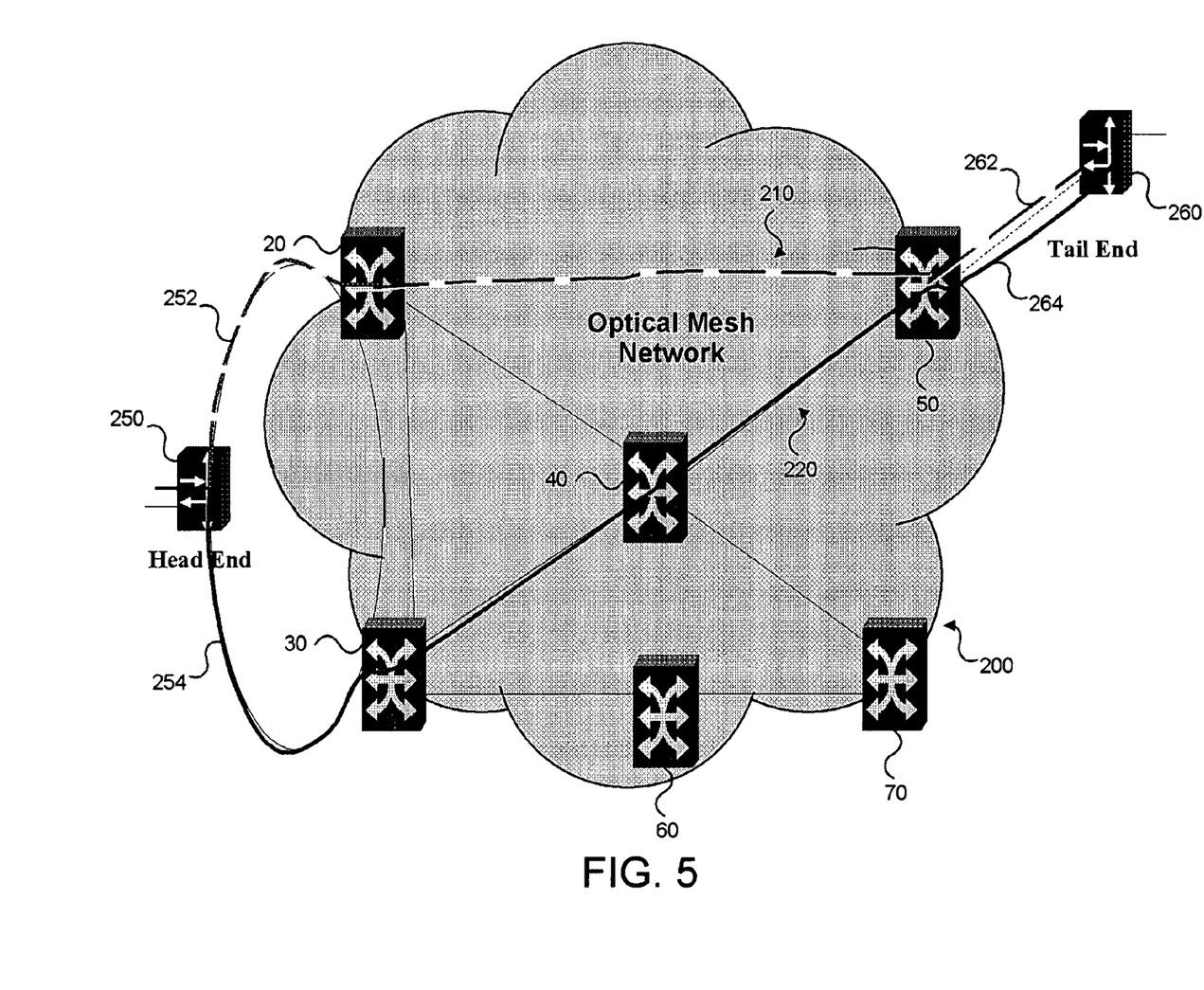
FIG. 5 illustrates a type-2 configuration of a mesh network having a working path and a protect path.

Referring to FIG. 5, a type-2 configuration is illustrated where the working path 220 and the protect path 210 are connected on one side to two different network elements within the mesh network (or two different drop sides on the same node). For example, as illustrated, the two different network elements 20 and 30. However, the working path 220 and the protect path 230 terminate to the same terminating network element 50 in optical mesh network 200. One or more edge networks can connect to the network elements 20 and 30 (or two different drop sides on the same node).

For example, a ring-based network can be connected the optical mesh network 200 on one side (e.g., head-end) and 1+1 APS protected lines can be connected the other side (e.g., tail-end). The network elements that connect to the ring-based networks can be two network elements as illustrated, or a single network element. For the single network element case, two different drop sides can be used. If the same drop side is used for a single network element, then a type-1 connection results. Further, as discussed above, the 1+1 mesh protection can interface to 1+1 APS lines, unprotected lines, 1:1 protected lines, SNCP protected drop lines, and the like.

Figure 6:
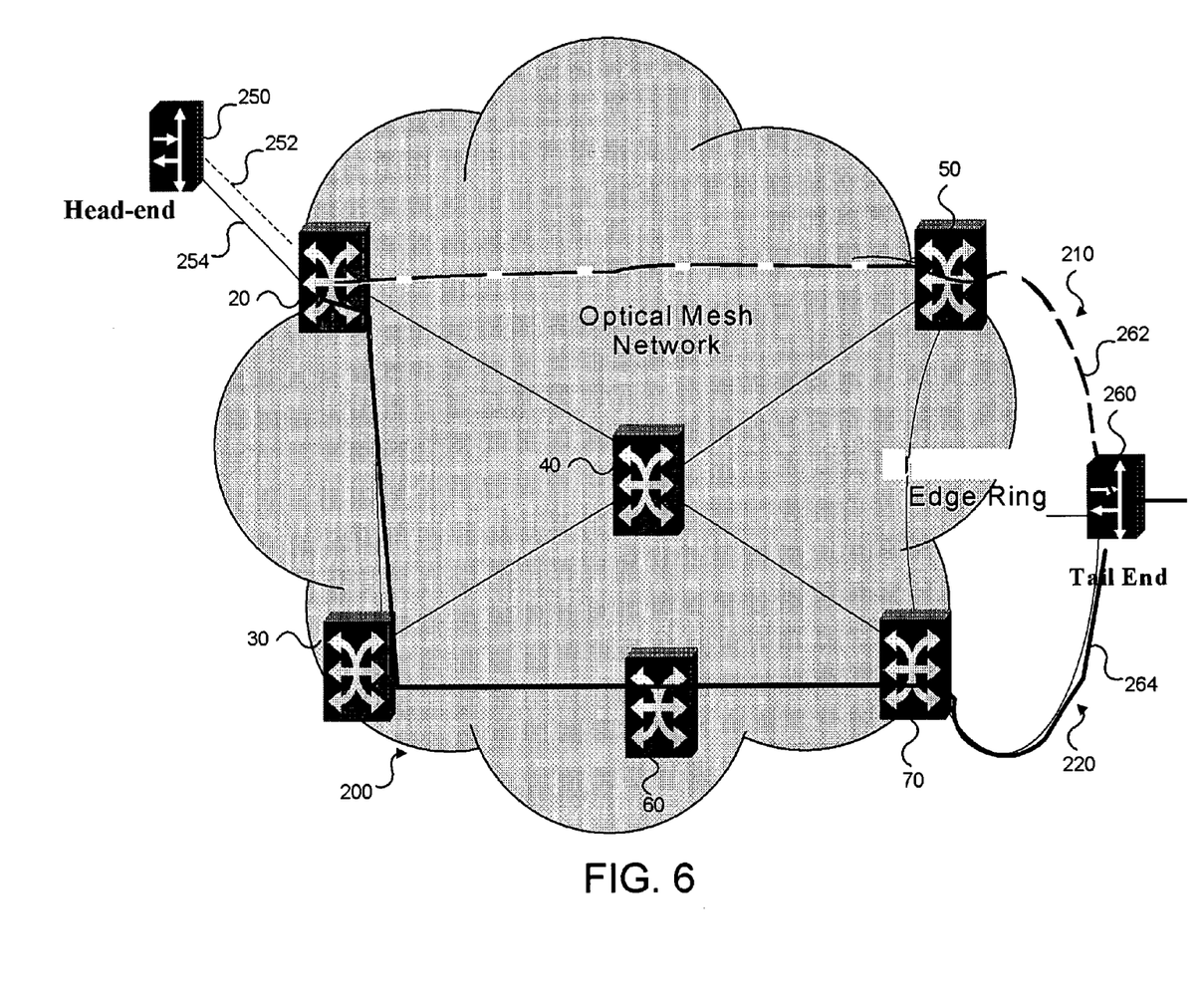
FIG. 6 illustrates a type-3 configuration of a mesh network having a working path and a protect path.

Referring to FIG. 6, a type-3 configuration is illustrated. In this configuration, the working path 220 and the protect path 210 can be connected on one side (e.g., head-end) to the same terminating network element 20 and the same drop side. However, in this case the working and protect paths terminate to two different network elements 50 and 70 (or two different drop sides on the same network element) in the optical mesh network 200. As discussed above, one or more edge networks can connect to the two terminating network elements 50 and 70 in the optical mesh network 200 (or the two different drop sides on the same node/network element) on the tail-end. Essentially, the type-3 configuration is a mirror image of the type-2 configuration previously described. Accordingly, this configuration can also provide 1+1 protection end to end.

In the type-1, type-2 and type-3 configurations, the terminating network element can include the provisioning, monitoring and restoration functions. Additionally, each network element can contain the bridge and selection functions, as previously mentioned. For example, referring to FIG. 6, network element 20 can receive traffic to be communicated to network element 260 over a 1+1 protection connection through mesh network 200. As noted above, embodiments of the invention allow for connection to a variety of external networks and elements such as unprotected links, 1:1 protected links, 1+1 linear APS, and the like. For example, as illustrated, terminating network element 20 can interface to external network element 250 via a 1+1 APS connection. The external working 254 and protect 252 links are connected to an intelligent terminating network element 20 (e.g., a CoreDirector switch). The terminating network element 20 can be used to automatically provision and setup paths 210 and 220, thereby providing the 1+1 mesh protection service through optical mesh network 200, as described above.

Further, assuming the connection to the external network element 250 is a single active link (e.g., traffic is only conducted on one link, such as in an unprotected line, or 1:1 protected line), the bridge function can be used to replicate the traffic received on the common link 254 and transmit the traffic over both the working 220 and protect 210 paths. Likewise, if the terminating network element 20 is transmitting traffic to an external network element over the common link 254 the select function can be used to select the best signal path and transmit the traffic from this path to the external network element 250 over common link 254.

Figure 7:
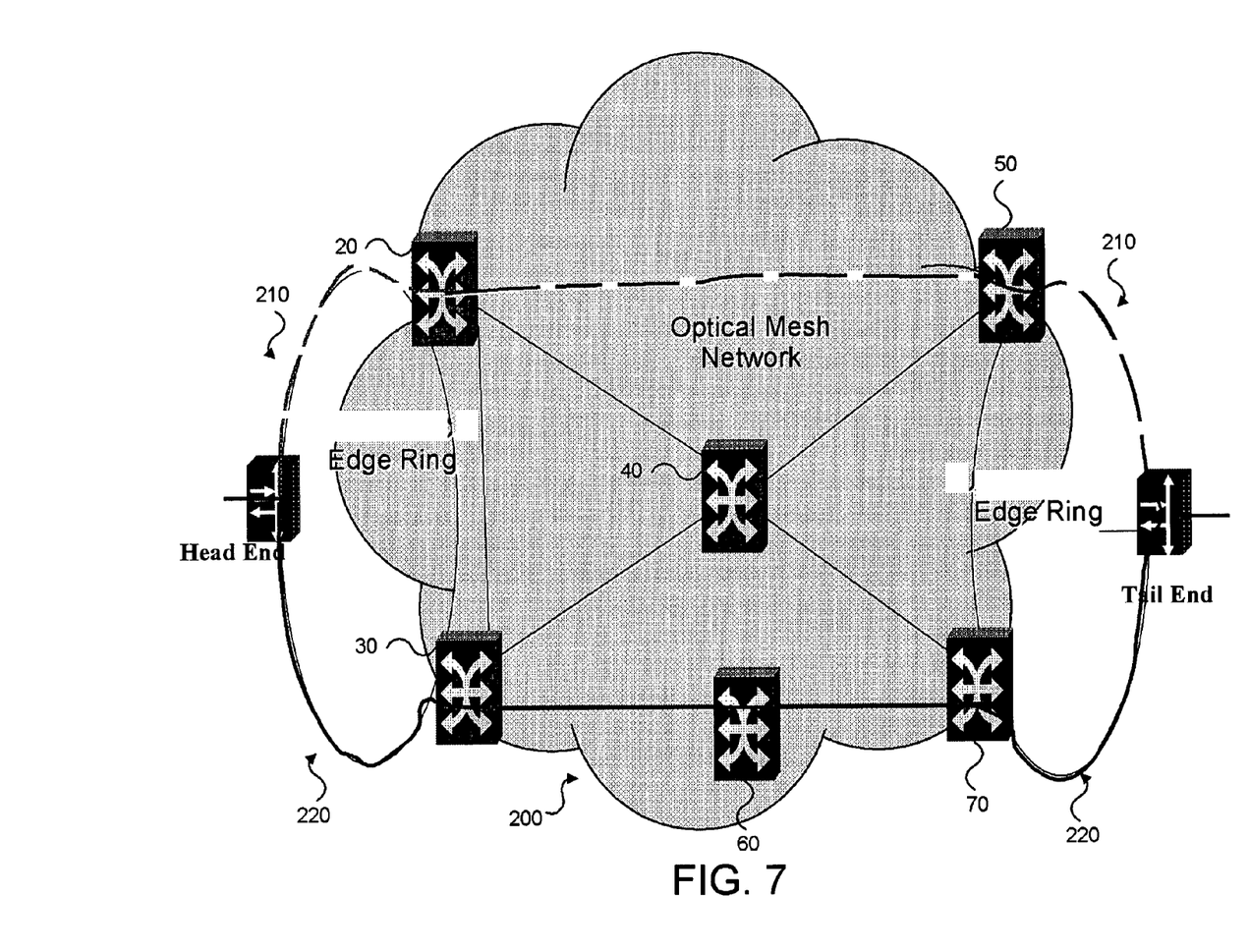
FIG. 7 illustrates a type-4 configuration of a mesh network having a working path and a protect path.

Referring to FIG. 7, a type-4 configuration is illustrated. The working path 220 and the protect path 210 originates from two different network elements 20 and 30 (or two different drop sides on the same network element) of the optical mesh network 200. The working path 220 and the protect path 210 terminate to two different network elements 50 and 70 (or two different drop sides on the same network element) of the optical mesh network 200. One or more edge networks can connect to the two originating network elements 20 and 30 (or the two different drop sides on the same network element) and the end network elements 50 and 70 (or the two different drop sides on the same network element). However, there is no terminating network element that is common to both the working 220 and protect path 210 in the optical mesh network 200. Accordingly, automatic provisioning and the path level monitoring of a 1+1 mesh protection connection is not available within a terminating network element in the mesh network. Therefore, conventional protection techniques can be used.

Those skilled in the art will appreciate the foregoing description of the various configurations was intended solely for illustration. Accordingly, many variations to the illustrated configurations will be apparent to those skilled in the art. For example, for type-1 and type-2 connections, the drop side on the originating network element (e.g., 20) in the optical mesh network 200 can be a Bidirectional Line-Switched Ring (BLSR), 1+1 APS line, 1:1 protected line, unprotected line and the like. Likewise, for type-1 and type-3 configurations, the drop side on the terminate network element (e.g., 50) in the optical mesh network 200 can be a Bidirectional Line-Switched Ring (BLSR), 1+1 APS line, 1:1 protected line, unprotected line and the like.

In accordance with at least one embodiment of the invention, the 1+1 mesh protection connection can be setup as follows. The first and second (e.g., working and protect) connections can be provisioned using an intelligent routing and signaling protocol (e.g., OSRP) based on a service profile established by a network administrator. No specific order of the provisioning is required, as the 1+1 mesh protection connection is not active until both paths are established. When a terminating network element receives a provision request for a 1+1 mesh protection connection, the network element can check whether its peer connection (corresponding working path or protect path connection) has been provisioned or not from the same network element. If its peer connection is identified, then the network element can verify that each peer's provision parameters are compatible. For example, for two connections to be peers in 1+1 mesh protection one is a working connection and the other is a protect connection. Typically, both connections have the same bandwidths and the same payload type (e.g., SDH, SONET). Additionally, both connections can have the same configuration type (e.g., type-1, type-2, type-3) as previously discussed. If the peers are not compatible, the new connection is rejected. If the peers are compatible, the process proceeds to setup the connections.

Figure 8A:
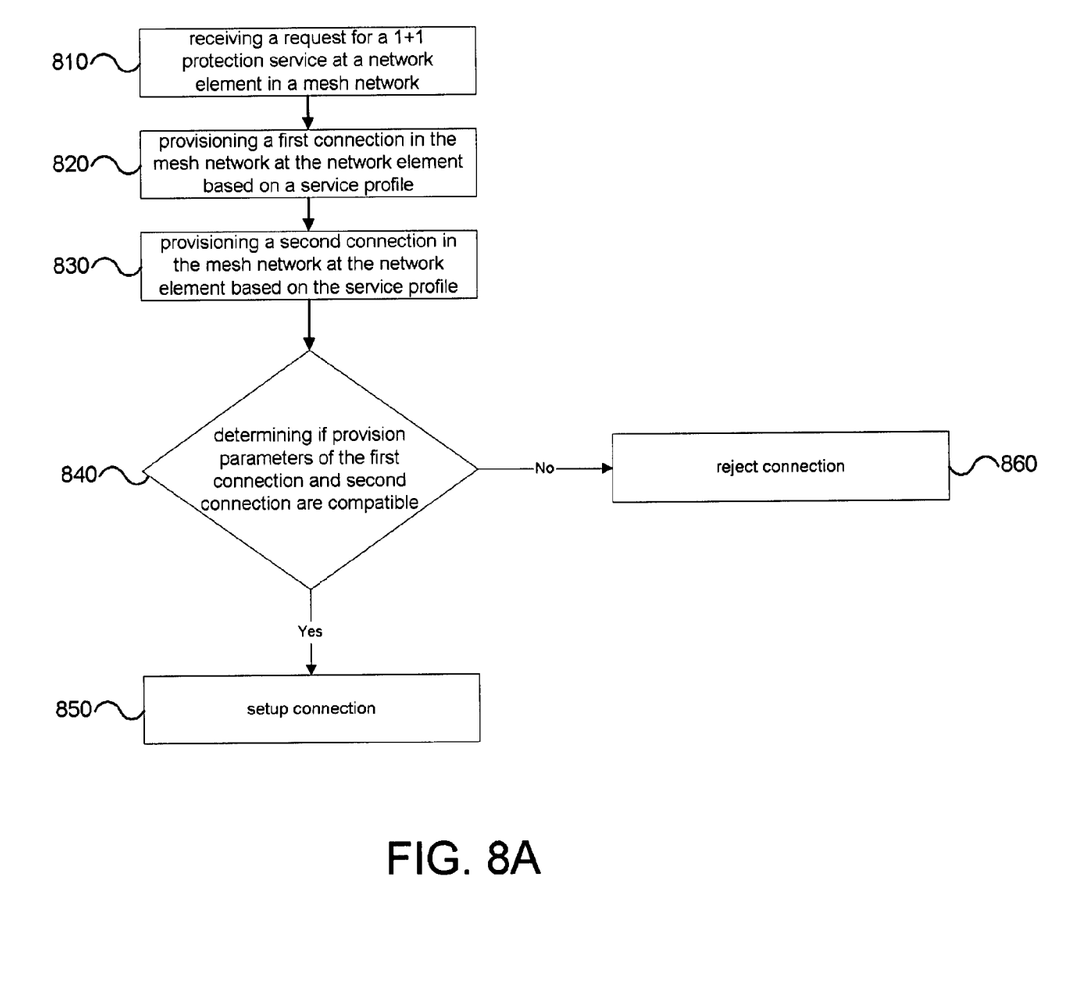
FIGS. 8A and 8B are flowcharts illustrating a process to establish 1+1 mesh protection in accordance with an embodiment of the invention.
Figure 8B:
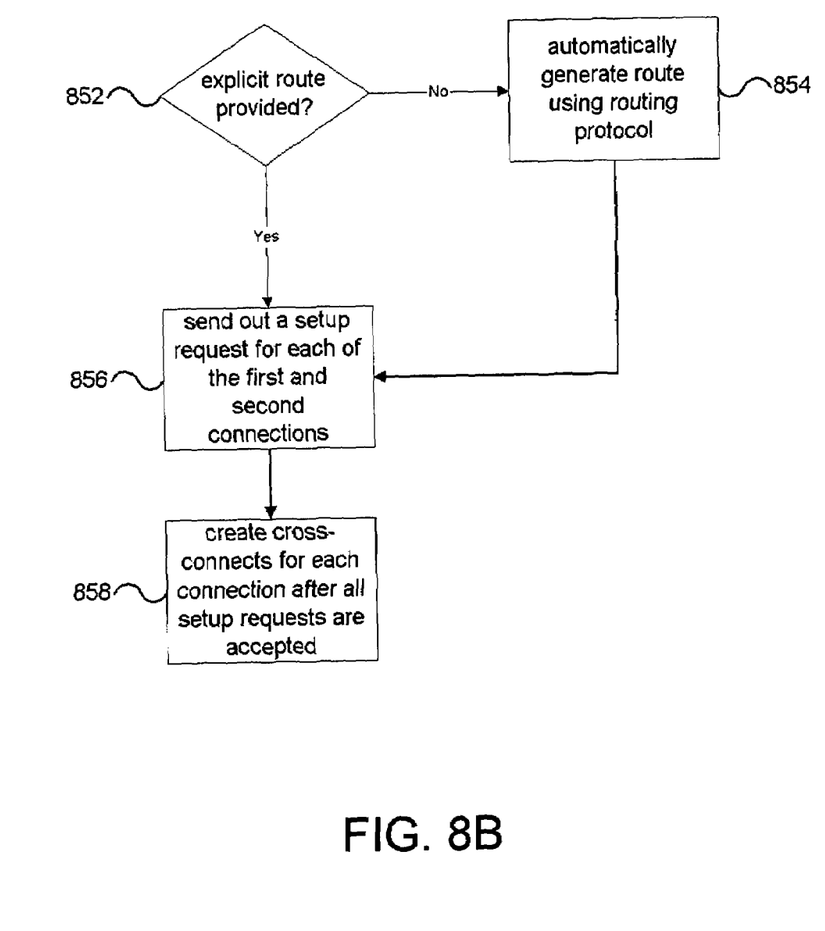

Accordingly, an embodiment of the invention can include a method such as illustrated in FIGS. 8A and 8B. The method can include receiving a request for a 1+1 protection service at a network element in a mesh network, block 810. A first connection (i.e., working or protect) is provisioned in the mesh network at the network element based on a service profile, block 820. A second connection (i.e., the other of the working or protect) is provisioned in the mesh network at the network element based on the service profile, block 830. The provisioning parameters of the first connection and the second connection are checked to determine if they are compatible, block 840. As discussed above the first and second (e.g., working and protect) connections are provisioned in a common network element, which allows for checking of the peer connection for compatibility. If the provision parameters are compatible, the first and second connections are setup, block 850. If the parameters are not compatible, the second connection is rejected, block 860, and the 1+1 protection service is not established.

If an explicit route is not provided for the new connection, the routing subsystem (e.g. optical routing protocol (ORP) subsystem of OSRP) can be used to calculate the route to the destination network element. Using the explicit route or automatically calculated route, the signaling subsystem (e.g. optical signaling protocol (OSP) subsystem of OSRP) can be used to setup requests for the connections. After all network elements along each route accept the setup, cross-connects can be created for each path and the connection can go live to carry traffic.

Further embodiments of the invention can include explicitly defining at least one of a first route for the first connection and a second route for the second connection, block 852. Alternatively, at least one of a first route for the first connection and a second route for the second connection can be automatically calculated using a routing subsystem of a signaling and routing protocol, block 854. Regardless of how the routes are determined, the first and second connections can be setup using a signaling subsystem of the signaling and routing protocol (e.g., OSRP). For example, the signaling subsystem can send out a setup request for each of the first and second connections, block 856 and create cross-connects for each of the first and second connections after all network elements along each connection in the mesh network accept the setup request, block 858.

In cases of a link failure along the working path and/or protect path (see, e.g., FIG. 3), mesh restoration using OSRP can be used to mesh restore the failed connection based on the original service profile. As discussed above, using mesh restoration can improve the availability of the 1+1 mesh protection connection because the failed connection (working or protect) can automatically be restored using an alternate route. Therefore, unlike prior related art systems that only switch to a protect connection in the event of a failure on the working connection, embodiments of the present invention automatically restore the failed connection so that the 1+1 protection is also restored.

The aspects of the invention have been described in connection with a number of exemplary embodiments. To facilitate an understanding of embodiments of the invention, many aspects were described in terms of sequences of actions to be performed by elements of a processor/processing system. Those skilled in the art will recognize that in at least some embodiments, the various actions could be performed by specialized circuits (e.g., discrete logic gates interconnected to perform a specialized function, application specific integrated circuits (ASICS), and the like), by program instructions or computer program code being executed by one or more processors, or by any combination of the foregoing.

Moreover, embodiments of the invention can additionally be considered to be embodied entirely within any form of a computer readable storage medium having stored therein an appropriate set of program instructions/code that can cause a processor to carry out the techniques described herein. Thus, embodiments of the invention can be in tangible media, such as a floppy diskette, CD, DVD, hard drive, magnetic tape, memory or any other computer-readable storage medium, wherein, when the program instructions/code is loaded into and executed by a processor, the processor becomes an apparatus for practicing an embodiment of the invention. Additionally, embodiments of the invention can include program instructions as a data signal transmitted via a transmission medium, such as over electrical wiring or cabling, through fiber optics, or via electromagnetic radiation, wherein, when the computer program code is loaded into and executed by a processor, the processor becomes an apparatus for practicing the embodiments of the invention.

Accordingly, the various aspects of the invention may be embodied in many different forms, and all such forms are contemplated to be within the scope of embodiments of the invention. For each of the various aspects, any such form of an embodiment can be referred to herein as "logic configured to" or "module configured to" perform a described action.

For example, in accordance with at least one embodiment of the invention, the network elements having an intelligent signaling and routing protocol (e.g., OSRP) can store and exchange network topology information to maintain a representation of the entire network topology. Using this information, a terminating network element can determine routing end to end in the optical mesh network, which is described in greater detail in previously referenced U.S. patent application Ser. No. 09/259,263, "Routing and Signaling in a SONET Network". Thus, by determining multiple end to end routes through the optical mesh network having the same parameters, the terminating network element can establish both working and protect paths through the network. Establishing protection paths is described in greater detail in previously referenced U.S. patent application Ser. No. 09/493,344, "System and Method for Calculating Protection Routes in a Network Prior to Failure".

Figure 9:
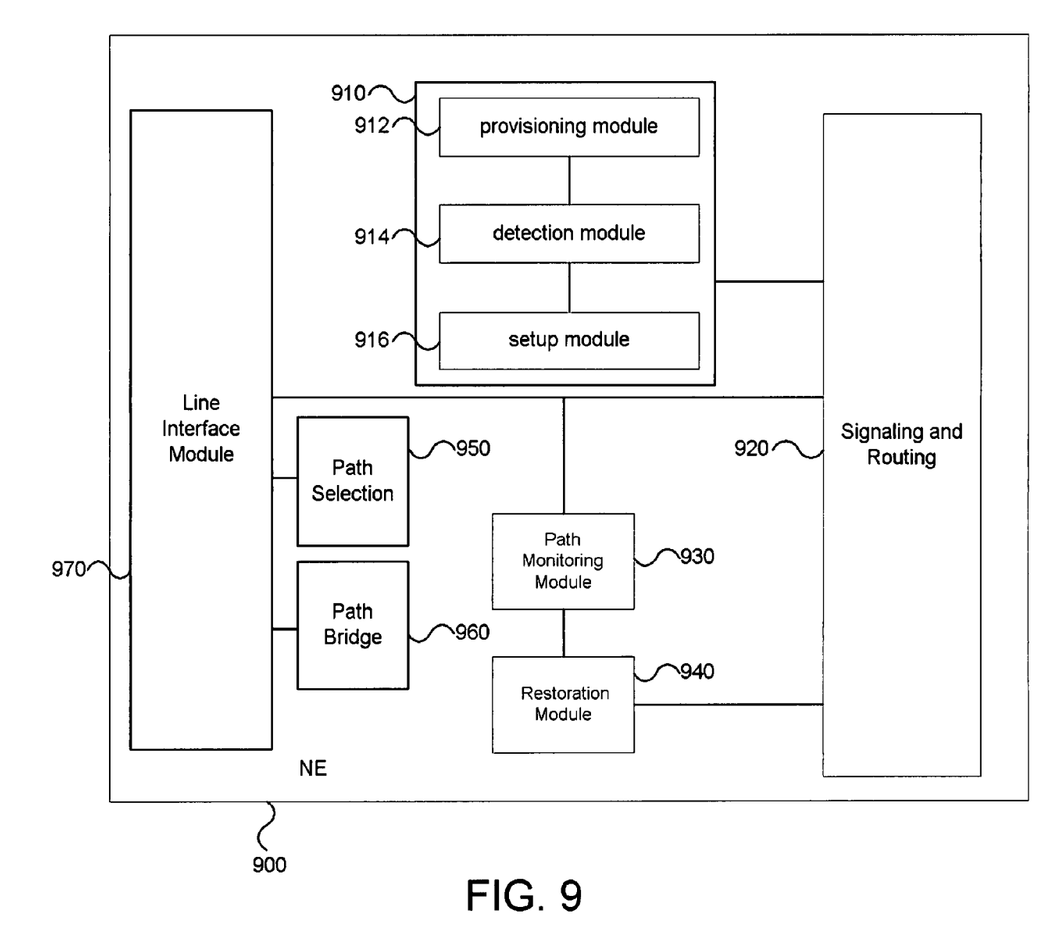
FIG. 9 is a system diagram illustrating a network element in accordance with an embodiment of the invention.

Embodiments of the invention exploit the aforementioned aspects of OSRP, to automatically setup a 1+1 mesh protection service. For example, referring to FIG. 9 a system configuration is shown. However, those skilled in the art will appreciate that the system diagram is merely for illustrative purposes and the various modules illustrated can be combined or divided into in any number of alternate configurations. For example, provisioning module 912, detection module 914 and setup module 916 can be combined into a common module 910 or combined into the signaling and routing module 920. Generally, as shown in FIG. 9 in an intelligent network element, the functional modules are operably interconnected to the physical lines and logical links (e.g., via line interface module 970) so that information can be derived from and control exercised (e.g., switching) over the physical lines and information contained therein. The ability for a network element to communicate between the various layers in an optical network is well know in the art and will not be discussed further herein.

A provisioning module 912 can be configured to receive a 1+1 mesh protection service request at a network element 900 in a mesh network. For example, a network operator can generate the 1+1 mesh protection request at a remote workstation having a graphical interface and can select the end network elements for the 1+1 mesh protection service. Additionally, the provisioning module 912 is configured to provision first and second connections in the mesh network at the network element 900 based on a service profile provided by the network operator. A detection module 914 can be configured to determine if provision parameters of the first connection and a second connection are compatible.

If the parameters of both the working and protect connection are not compatible, setup module 916 can reject the connection. However, If the parameters of both connections are compatible, then setup module 916 can request that the connections are setup, for example, via routing and signaling module 920, as discussed in the foregoing description. Further, after the routes are generated, the signaling subsystem of the signal and routing module (e.g., OSRP) can send out the setup requests and establish the cross connects after each network element in a given route accepts the setup request. Alternatively, these functions can be separate modules or part of the setup module.

Those skilled in the art will appreciate that the functionality of the processes discussed in the foregoing description is incorporated into the various modules illustrated in FIG. 9. For example, a path monitoring module 930 can be configured to monitor each of the working and protect paths. Upon detecting a failure, a path restoration module 940 can generated the appropriate release and rerouting signals using the signaling and routing module (e.g., OSRP) to automatically restore failed links and/or reroute a failed path in a mesh network, as previously described.

Additionally, a bridge module 960 can be configured to bridge traffic received on a common path to both the first connection and the second connection. A selection module 950 can be configured to select traffic on one of the first connection and the second connection (working and protect paths), based on signal quality of the first connection and signal quality of the second connection.

The foregoing description and accompanying drawings illustrate the principles, preferred embodiments and modes of operation of the invention. However, the invention should not be construed as being limited to the particular embodiments discussed above. For example, although FIG. 9 illustrates the various modules being integrated into a network element, the modules can be realized in a variety of forms, such as a computer readable medium, and an optical signaling and routing protocol (OSRP) and the like.

Further, although reference was made to optical networks, OSRP and SONET, the invention is not limited to these specific examples. Additionally, in alternative embodiments, the network can be any type of network. The working and protect links can be any type of conduit, including wireless transmission links, electrical wireline connections and the like. Further, the network elements can be any type of network element, including a router, switch, a transport device, an optical amplifier, an add/drop multiplexer, a transmitter, a receiver, a transceiver, an end terminal and the like. The routing and signaling protocol can be any type of signaling/routing protocol for connection oriented networks (e.g., PNNI, OSPF, RSVP or MPLS) that can or can be adapted to provide the functionality discussed above in relation to OSRP.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A 1+1 mesh protection method comprising:
   receiving a request for a 1+1 protection service at a network element in a mesh network;
   provisioning a first connection in the mesh network at the network element based on a service profile;
   provisioning a second connection in the mesh network at the network element based on the service profile;

determining if provision parameters of the first connection and the second connection are compatible;

setting up the first and second connections if the provision parameters are compatible; and rejecting the first and second connections if the provision parameters are not compatible.

2. The method of claim 1, wherein the first connection is one of a working connection and a protection connection and the second connection is the other of the working and protection connection.

3. The method of claim 1, wherein the provision parameters of both connections are compatible, if both paths have the same bandwidth.

4. The method of claim 1, wherein the provision parameters of both connections are compatible, if both connections have a similar payload type.

5. The method of claim 4, wherein the payload type is at least one of SDH and Sonet.

6. The method of claim 1, wherein setting up the first and second connections comprises:

sending out a setup request for each of the first and second connections; and creating cross-connects for each of the first and second connections after all network elements along each connection in the mesh network accept the setup request.

7. The method of claim 1, further comprising:

automatically calculating at least one of a first route for the first connection and a second route for the second connection using a routing subsystem of a signaling and routing protocol, and wherein the setting up the first and second connections is performed using a signaling subsystem of the signaling and routing protocol.

8. The method of claim 7, wherein the signaling and routing protocol is Optical Signaling and Routing Protocol (OSRP).

9. The method of claim 1, further comprising:

explicitly defining at least one of a first route for the first connection and a second route for the second connection, and wherein the setting up the first and second connections is performed by using a signaling subsystem of the signaling and routing protocol.

10. The method of claim 1, further comprising:

bridging traffic received on a common path to both the first connection and the second connection.

11. The method of claim 1, further comprising:

monitoring the first connection and second connection at the network element; and automatically restoring a failed connection within the mesh network upon detecting a failure in at least one of the first connection and the second connection.

12. The method of claim 1, further comprising:

selecting traffic on one of the first connection and the second connection, based on signal quality of the first connection and signal quality of the second connection.

13. The method of claim 1, wherein the mesh network is an optical mesh network.

14. A 1+1 mesh protection system comprising:

a provisioning module configured to receive a request for a 1+1 protection service at a network element in a mesh network and to provision first and second connections in the mesh network at the network element based on a service profile;

a detection module configured to determine if provision parameters of the first connection and a second connection are compatible; and a setup module configured to set up the first and second connections if the provision parameters are compatible and to reject the first and second connections if the provision parameters are not compatible.

15. The system of claim 14, wherein the first connection is one of a working connection and a protection connection and the second connection is the other of the working and protection connection.

16. The system of claim 14, wherein the provision parameters of both connections are compatible, if both paths have the same bandwidth.

17. The system of claim 14, wherein the provision parameters of both connections are compatible, if both connections have a similar payload type.

18. The system of claim 17, wherein the payload type is at least one of SDH and SONET.

19. The system of claim 17, further comprising:

a module configured to send out a setup request for each of the first and second connections; and a module configured to create cross-connects for each of the first and second connections after all network elements along each connection in the mesh network accept the setup request.

20. The system of claim 14, further comprising:

a module to configured to automatically calculate at least one of a first route for the first connection and a second route for the second connection using a routing subsystem of a signaling and routing protocol, and wherein the setup module use a signaling subsystem of the signaling and routing protocol to setup the first and second connections.

21. The system of claim 20, wherein the signaling and routing protocol is Optical Signaling and Routing Protocol (OSRP).

22. The system of claim 14, wherein at least one of a first route for the first connection and a second route for the second connection is explicitly defined, and wherein the setup module uses a signaling subsystem of the signaling and routing protocol to setup the first and second connections.

23. The system of claim 14, further comprising:

a bridge module configured to bridge traffic received on a common path to both the first connection and the second connection.

24. The system of claim 14, further comprising:

a path monitor module configured to monitor the first connection and second connection at the network element; and a restoration module configured to automatically restore a failed connection within the mesh network upon detecting a failure in at least one of the first connection and the second connection.

25. The system of claim 14, further comprising:

a selection module configured to select traffic on one of the first connection and the second connection, based on signal quality of the first connection and signal quality of the second connection.

26. The system of claim 14, wherein the system is at least one of a network element, a computer readable medium, and an optical signaling and routing protocol.

27. A 1+1 mesh protection apparatus comprising:

means for receiving a request for a 1+1 protection service at a network element in a mesh network;

means for provisioning a first connection in the mesh network at the network element based on a service profile;
means for provisioning a second connection in the mesh network at the network element based on the service profile;
means for determining if provision parameters of the first connection and the second connection are compatible;
means for setting up the first and second connections if the provision parameters are compatible; and
means for rejecting the first and second connections if the provision parameters are not compatible.

28. The apparatus of claim 27, further comprising:
means for automatically calculating at least one of a first route for the first connection and a second route for the second connection using a routing subsystem of a signaling and routing protocol, and
wherein the means for setting up the first and second connections is a signaling subsystem of the signaling and routing protocol.

29. The apparatus of claim 27, further comprising:
means for monitoring the first connection and second connection at the network element; and
means for automatically restoring a failed connection within the mesh network upon detecting a failure in at least one of the first connection and the second connection.

* * * * *